US010779432B1

(12) United States Patent
Duncan

(10) Patent No.: US 10,779,432 B1
(45) Date of Patent: Sep. 15, 2020

(54) MODULAR EDGE DATA CENTER THAT AUTONOMOUSLY SECURES INFORMATION TECHNOLOGY COMPONENTS, COMPUTING WORKLOAD, AND DATA IN RESPONSE TO UNEXPECTED LOSS OF COMMUNICATION

(71) Applicant: DELL PRODUCTS, L.P., Round Rock, TX (US)

(72) Inventor: Tyler B. Duncan, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/653,932

(22) Filed: Oct. 15, 2019

(51) Int. Cl.
*H04M 3/16* (2006.01)
*H05K 7/14* (2006.01)
*H04L 9/08* (2006.01)
*H04L 29/06* (2006.01)
*H04Q 1/06* (2006.01)

(52) U.S. Cl.
CPC ........... *H05K 7/1495* (2013.01); *H04L 9/083* (2013.01); *H04L 9/0891* (2013.01); *H04L 63/0478* (2013.01); *H04Q 1/06* (2013.01); *H05K 7/1492* (2013.01); *H04L 2463/082* (2013.01)

(58) Field of Classification Search
CPC .... H05K 7/1495; H05K 7/1492; H04L 9/083; H04L 9/0891; H04L 63/0478; H04L 2463/082; H04Q 1/06

USPC .......................................... 455/411; 370/338
See application file for complete search history.

(56) References Cited

U.S. PATENT DOCUMENTS

| | | | |
|---|---|---|---|
| 8,321,616 B2 | 11/2012 | Lambert et al. | |
| 9,461,456 B2 | 10/2016 | Bailey | |
| 10,110,277 B2 | 10/2018 | Varma et al. | |
| 2006/0181413 A1* | 8/2006 | Mostov | G08B 25/009 340/539.22 |

* cited by examiner

*Primary Examiner* — Marcos Batista
(74) *Attorney, Agent, or Firm* — Isidore PLLC

(57) ABSTRACT

A modular data center (MDC) has information technology (IT) component(s) positioned within an interior enclosure of a volumetric container of the MDC. An in-band communication network connection is between the IT component(s) and a data center external to the MDC. A security system includes a controller that is communicatively coupled to the IT component(s) and the in-band communication network connection. The controller executes a security platform application that enables the MDC to secure the IT component(s). The controller monitors the in-band communication network connection for a loss in communication that can be indicative of a preparatory act by an unauthorized person to compromise the IT component(s) or access computing workload and/or data. In response to determining that the in-band communication network connection is not operable, the controller autonomously secures the IT component(s), computing workload, and data by removing a locking key of a storage device to encrypt storage media.

19 Claims, 9 Drawing Sheets

MODULAR EDGE DATA CENTER THAT AUTONOMOUSLY SECURES INFORMATION TECHNOLOGY COMPONENTS, COMPUTING WORKLOAD, AND DATA IN RESPONSE TO UNEXPECTED LOSS OF COMMUNICATION

BACKGROUND

1. Technical Field

The present disclosure relates in general to security of a modular data center (MDC), and more particularly to a security system that secures information technology (IT) components of an MDC.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A data center houses IHSs and associated components, such as telecommunications and storage systems. A modular data center (MDC) is a deployable data center. An MDC can be placed anywhere data capacity is needed. MDC systems consist of purpose-engineered modules and components that offer scalable data center capacity with multiple power and cooling options. Modular edge data centers (MEDCs) are generally smaller MDC facilities that extend the edge of the network to deliver cloud computing resources and cached streaming content to local end users. MEDCs that have only one or two racks for IT are also referred to as micro MDCs. Many MEDCs are deployed as a single volumetric container that is installed in a remote location, such as north of the Arctic Circle. At these remote locations, a malicious intruder to the MEDC, even if detected, would have time to gain physical access to IHSs within the MEDC before any human intervention response could occur. More than the potential loss of the value of hardware, the intrusion jeopardizes time sensitive workloads handled by the compromised MEDC, compromises other IHSs that are network-connected to the compromised MEDC, and places sensitive enterprise data contained in the MEDC at risk.

BRIEF SUMMARY

In accordance with the teachings of the present disclosure, a modular data center (MDC) includes a volumetric container having an interior enclosure. At least one information technology (IT) component is positioned within a selected at least one of: (i) the interior enclosure of the volumetric container; and (ii) an exterior panel attached to the volumetric container. The at least one IT component includes at least one of: (i) a storage device containing storage media; and (iii) a physical communication port that enables local access to the at least one IT component. An in-band communication network connection is provided between the at least one IT component and a data center that is external to the MDC. A security system includes a controller that is communicatively coupled to the at least one IT component and the in-band communication network connection. The controller executes a security platform application that enables the MDC to secure the at least one IT component, computing workload, and/or data from an impending external physical threat. To secure the at least one IT component, computing workload, and/or data the controller monitors the in-band communication network connection for a loss in communication that that can be indicative of a preparatory act by an unauthorized/un-authenticated person to compromise the at least one IT component or access the computing workload and/or the data. The controller determines whether the in-band communication network connection is operable for communication between the at least one IT component and the data center. In response to determining that the in-band communication network connection is not operable for communication between the at least one IT component and the data center, the controller secures the at least one IT component and the computing workload and/or the data by performing a selected one or more of: (i) removing a locking key of the storage device to encrypt the storage media; and (ii) disabling the physical communication port to prevent access to the at least one IT component via a device inserted in the physical communication port by the unauthorized person.

In accordance with the teachings of the present disclosure, an MDC security system includes a controller communicatively coupled to at least one IT component positioned within a selected at least one of: (i) an interior enclosure of a volumetric container of an MDC; and (ii) an exterior panel attached to the volumetric container. The at least one IT component includes at least one of: (i) a storage device containing storage media; and (iii) a physical communication port that enables local access to the at least one IT component. The controller is communicatively coupled to an in-band communication network connection between the at least one IT component and a data center external to the MDC. The controller executes a security platform application that enables the MDC to secure the at least one IT component, computing workload, and/or data. To secure the at least one IT component, computing workload, and/or data, the controller monitors the in-band communication network connection for a loss in communication that that can be indicative of a preparatory act by an unauthorized person to compromise the at least one IT component and/or access the computing workload and/or data. The controller determines whether the in-band communication network connection is operable for communication between the at least one IT component and the data center. In response to determining that the in-band communication network connection is not operable for communication between the at least one IT component and the data center, the controller secures the at least one IT component, the computing workload, and/or the data by performing a selected one or more of: (i) removing a locking key of the storage device to encrypt the storage media; and (ii) disabling the physical communication port to prevent access to the at least one IT component via a device inserted in the physical communication port by the unauthorized person.

In accordance with the teachings of the present disclosure, a method is disclosed for autonomously securing IT components, computing workload, and data of an MDC from any unauthorized/un-authenticated person in response to detecting a loss of communication with a data center. The loss of communication can be indicative of a preparatory act by an unauthorized person to compromise the MDC. The method includes monitoring an in-band communication network connection provided between at least one IT component and a data center that is external to a volumetric container of an MDC. The at least one IT component is positioned within a selected at least one of: (i) an interior enclosure of the volumetric container; and (ii) an exterior panel attached to the volumetric container. The at least one IT component includes at least one of: (i) a storage device containing storage media; and (iii) a physical communication port that enables local access to the IT component. The method includes determining whether the in-band communication network connection is operable for communication between the at least one IT component and the data center. In response to determining that the in-band communication network connection is not operable for communication between the at least one IT component and the data center, which can be indicative of a preparatory act by an unauthorized person to compromise the at least one IT component, and/or access the computing workload and/or data, the method includes performing a security measure that secures the at least one IT component, the computing workload, and/or the data by performing a selected one or more of: (i) removing a locking key of the storage device to encrypt the storage media; and (ii) disabling the physical communication port to prevent access to the at least one IT component via a device inserted in the physical communication port by the unauthorized person.

The above presents a general summary of several aspects of the disclosure to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
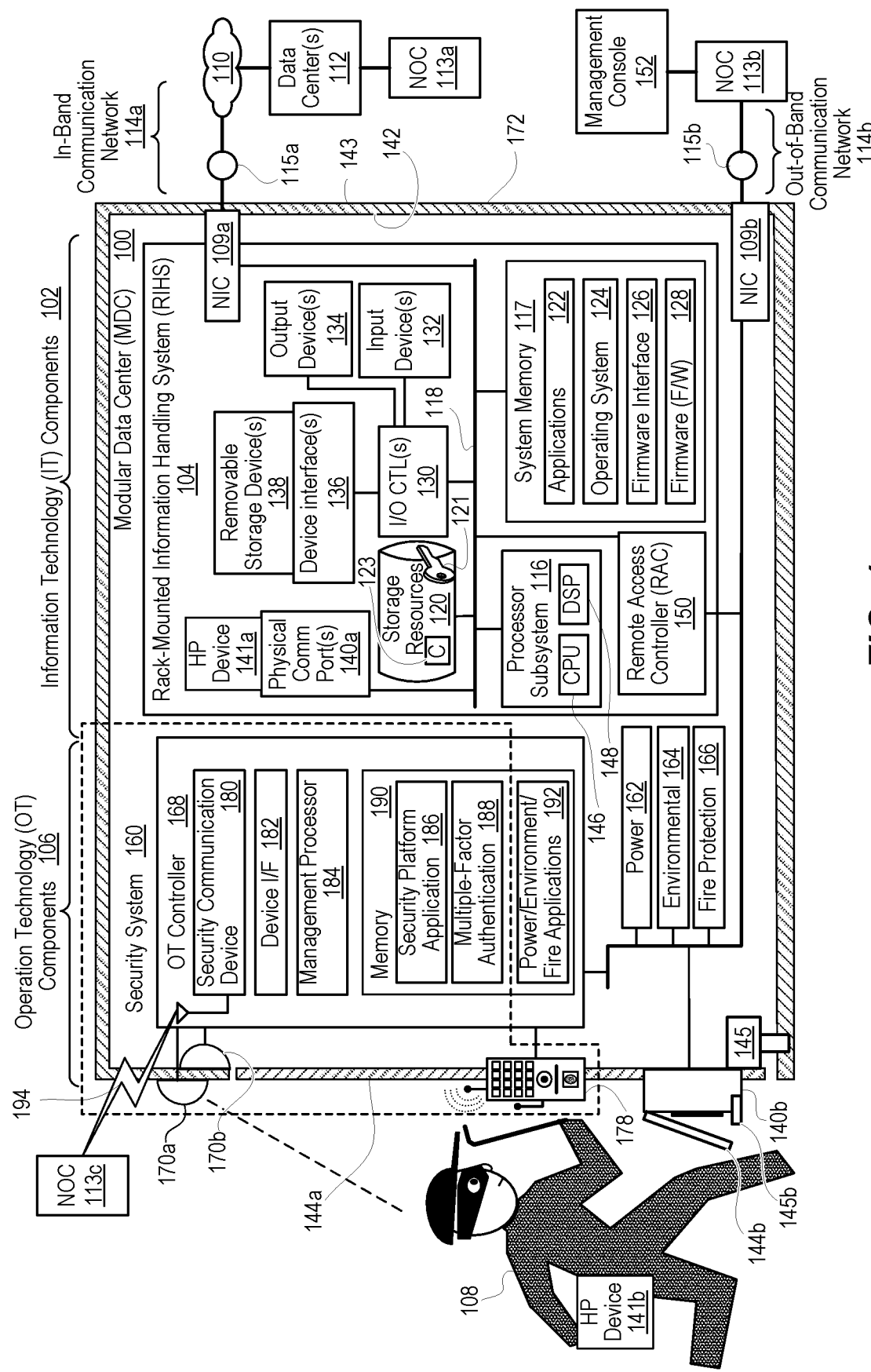
FIG. 1 is a block diagram of a modular data center (MDC) that autonomously secures IT components of an MDC from an unauthorized person, according to one or more embodiments.

According to aspects of the present disclosure, a modular data center (MDC), an MDC security system, and a method are provided that secure information technology (IT) component(s) of the MDC in response to a loss of external communication that could be a prelude to an external physical threat to the MDC. The IT component(s) are positioned within a selected at least one of: (i) an interior enclosure of a volumetric container of an MDC; and (ii) an exterior panel attached to the volumetric container. An in-band communication network connection is between the IT component(s) and a data center external to the MDC. A security system includes a controller that is communicatively coupled to the IT component(s) and the in-band communication network connection. The controller executes a security platform application that enables the MDC to secure the IT component(s). The controller monitors the in-band communication network connection for a loss in communication that that can be indicative of a preparatory act by an unauthorized person to compromise the at least one IT component. The controller determines whether the in-band communication network connection is operable for communication between the IT component(s) and the data center. In response to determining that the in-band communication network connection is not operable for communication between the IT component(s) and the data center, the controller secures the IT component(s) by removing a locking key of a storage device to encrypt storage media; and/or disabling physical communication port to prevent access to the at least one IT component via a device inserted in the physical communication port by the unauthorized person.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 is a simplified functional block diagram of modular data center (MDC) 100 having IT components 102 such as rack-mounted information handling systems (RIHSs) 104 that receive infrastructure support by operation technology (OT) components 106, including security from external threats such as unauthorized, unauthenticated person 108. Within the general context of IHSs, RIHS 102 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, RIHS 104 may be a personal digital assistant (PDA), a consumer electronic device, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. RIHS 104 may also include one or more buses operable to transmit communications between the various hardware components. In one or more embodiments, RIHS 104 is rack-mounted to provide computing, communication and storage functionality in MDC 100.

RIHS 104 includes a network interface, depicted as network interface controller (NIC) 109a, in communication via network 110 for communicating with data center(s) 112. Management of data center(s) 112 is provided by network operations center (NOC) 113a. NIC 109a enables RIHS 104 and/or components within RIHS 104 to communicate and/or interface with other devices, services, and components that are located external to RIHS 104. These devices, services, and components can interface with RIHS 104 via an external network, such as network 110, using one or more communication protocols that include transport control protocol (TCP/IP) and network block device (NBD) protocol. Network 110 can be a local area network, wide area network, personal area network, and the like, and the connection to and/or between network 110 and RIHS 104 can be wired, wireless, or a combination thereof. For purposes of discussion, network 110 is indicated as a single collective component for simplicity. However, it should be appreciated that network 110 can comprise one or more direct connections to other devices as well as a more complex set of interconnections as can exist within a local area network or a wide area network, such as the Internet. In one or more embodiments, NIC 109a supports in-band communication network 114a via connection 115a that transfers workload and computer data between IT components 102 and data center(s) 112. In one or more embodiments, data center(s) 112 is cloud based.

Processor subsystem 116 is coupled to system memory 117 via system interconnect 118. System interconnect 118 can be interchangeably referred to as a system bus, in one or more embodiments. System interconnect 118 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. For the purpose of this disclosure, system interconnect 118 can also be a Double Data Rate (DDR) memory interface. The system memory 117 can either be contained on separate, removable dual inline memory module (RDIMM) devices or system memory 117 can be contained within persistent memory devices (NVDIMMs). For example, the NVDIMM-N variety of NVDIMMs contain both random access memory, which can serve as system memory 117, and non-volatile memory. It should be noted that other channels of communication can be contained within system interconnect 118, including but not limited to i2c or system management bus (SMBus). System interconnect 118 communicatively couples various system components. Examples of these system components include replaceable local storage resources 120, such as solid-state drives (SDDs) and hard disk drives (HDDs).

In a particular one or more embodiments, local storage resources 120 can include or comprise self-encrypting drives (SEDs) that protecting data from unauthorized access. SEDs use two sets of keys to protect the data from unauthorized access. One key is called the media encryption key (MEK). In the drive factory, each SED randomly generates an MEK that is encrypted and embedded within the drive. The MEK is never exposed outside the drive and requires no management by the user. The MEK functions as a secret password so that the encryption/decryption engine built into the drive will know how to decrypt the user data stored on the physical media. The encryption in the drive uses a symmetric key algorithm which means the MEK is the same for encrypting and decrypting the data on the disk. This MEK can be changed by cryptographic erase (CE), but the encryption can never be turned off. CE is a feature that permanently changes the MEK so the drive can be reused or repurposed. After the CE is performed, the data previously written to the drive becomes unreadable. CE is also known as secure erase or crypto-erase. The second required key is called the authority credential (AC), sometimes referred to as the locking key, credentials, authentication keys, or access key (AK). It is used to unlock and configure the SED. There is one AC for each SED. For example, DELL storage controller (SC) Series arrays automatically detect SED drives and will create the ACs when the array is initially configured with SEDs or when SEDs are added to a legacy system. The AC is stored in a KMIP secret data object on the KMS. There is one valid secret data object for each SED that has been put into a lockable state. An SC Series array completes a Key Management Interoperability Protocol (KMIP) register on this secret data object, and the secret data object "keyblock" contains the AC. The SC array also controls the contents of the secret data object.

Once an SED has been configured with an AC, the AC must be provided to unlock the drive, and the drive remains unlocked only while the device is powered on. The drive locks itself upon losing power or shutting down, and the AC must be provided again before the drive will unlock and participate in input/output (I/O) operations. The process of how data is accessed on an SED during normal operation includes: (i) Upon boot, storage controller operating system (SCOS) sends a series of commands to the drive to unlock the drive. One of those commands is an authentication request which carries the AC. (ii) The drive electronics hash the AC from the storage controller and pull the stored hashed access key from the drive storage. The hashed keys are compared. (iii) If the hashed keys do not match, no access is given to the data and a security error is passed back to the storage controller stating that the drive is locked and that the subsystem does not have authorization to access it. If the hashed keys match, a subsequent drive command is sent to unlock the drive. (iv) During a request for data, the encrypting/decrypting circuit pulls the requested data from the drive and uses the MEK to decrypt the encrypted user data. The decrypted user data is then passed back to the storage controller. The drive remains unlocked until the drive gets powered down. If removed, the drive becomes a locked drive in which security has been enabled and the drive has been unexpectedly removed from the storage array, or powered down. Data on the drive cannot be read from or written to until the appropriate AC is provided. Thus, contents 123 of storage resources 120 can be selectively protected by locking keys 121 issued to storage resources 120 to make content 123 externally available without encryption. Deleting locking keys 121 does not preclude continued operation within MDC 100 but does protect the content 123 from exploitation if a particular storage resource 120 is removed from MDC 100.

Software and/or firmware modules and one or more sets of data can be stored on local storage resources 120 and be utilized during operations of RIHS 104. Specifically, in one embodiment, system memory 117 can include therein a plurality of such modules, including one or more of application(s) 122, operating system (OS) 124, a firmware interface 126 such as basic input/output system (BIOS) or Uniform Extensible Firmware Interface (UEFI), and platform firmware (FW) 128. These software and/or firmware modules have varying functionality when their corresponding program code is executed by processor subsystem 116 or secondary processing devices within RIHS 104. For example, application(s) 122 may include a word processing application, a presentation application, and a management station application, among other applications.

RIHS 104 further includes one or more input/output (I/O) controllers 130 that support connection by and processing of signals from one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136, such as an optical reader, a universal serial bus (USB), a card reader, Personal Computer Memory Card International Association (PCMCIA) slot, and/or a high-definition multimedia interface (HDMI), can be associated with RIHS 104. Device interface(s) 136 can be utilized to enable data to be read from or stored to corresponding removable storage device(s) 138, such as a compact disk (CD), digital video disk (DVD), flash drive, or flash memory card. In one or more embodiments, device interface(s) 136 can further include general purpose I/O interfaces such as inter-integrated circuit ($I^2C$), system management bus (SMB), and peripheral component interconnect (PCI) buses. Physical communication port(s) 140a that are communicatively coupled to system interlink 118 enable coupling of other devices with/to RIHS 104. For example, external physical communication port 140b can be used to gain access to RIHS 104 without having to work inside of the close confines of interior enclosure 142 of volumetric container 143 of MDC 100. One or more doors 144a, physically secured by door lock(s) 145a, enable physical access to IT components 102 and OT components 106. In one or embodiments, door lock(s) 145a include or is associated with door opened and/or door closed sensor. Hot pluggable (HP) device 141a is engaged to physical communication port 140a. HP device 141b is not yet engaged to either physical communication port 140a or external physical communication port 140b. External physical communication port 140b is accessible via small door 144b that is physically secured by small door lock 145b. In one or embodiments, door lock 145b include or is associated with door opened and/or door closed sensor. In one or more embodiments, hot pluggable devices 141b, 141b are a selected one of: (i) a storage device containing at least one of: (a) computer program code; (b) computer data; and (c) digital media; and (ii) an encryption key device.

Processor subsystem 116 can include at least one central processing unit (CPU) 146 that is augmented by digital signal processor (DSP) 148. Processor subsystem 116 interfaces to functional components of the RIHS 100 such as a baseboard management controller (BMC). Remote access controller (RAC) 150 performs BMC functionality including monitoring the physical state of a computer, network server, or other hardware devices of IT components 102 using sensors. RAC 150 also supports communicating with a system administrator through an independent connection, such as NIC 109b. As a non-limiting example, RAC 150 can be an improved integrated Dell Remote Access Controller (iDRAC) from Dell® that supports in part security operation functionality described herein. The iDRAC has the ability to edit/create files locally to itself. The iDRAC also has the ability to see OS specific files. RAC 150 performs out-of-band communication for the RIHS 100 via NIC 109b. In one or more embodiments, NIC 109a supports out-of-band communication network 114b via connection 115b to administrative or management console 152 at NOC 113b.

To manage operations of MDC 100, management console 152 transfers administrative data, administrative settings and upgraded computer code via out-of-band communication network 114b to OT components 106. In one or more embodiments, OT components 106, under control of OT controller 168, provide infrastructure operational support to IT components 102 of MDC 100. OT components 106 include security system 160, power system 162, environmental system 164, and fire protection system 166.

Security system 160, in general, protects MDC 100, and in particular, protects valuable enterprise workloads and data, from exterior threats such as by unauthorized person or a person with malicious intent. The person is classified as unauthorized if the person is unable to provide the correct authentication credentials within a time period following detection of the person by the sensors. For purposes of the disclosure, such a person is referred to as unauthenticated person 108, and it is appreciated that in some instances, the detected person can be "authorized", but does not possess the correct security credentials or cannot provide the credentials in the time allotted for entry of the security credential. Conversely, the person can be identifiable via correct security credentials but is not individually pre-authorized to be at MDC 100 or has arrived outside of an authorized schedule for personnel to access MDC 100. One or more sensors 170a, 170b of security system 160 detects a presence of a person in at least one of: (i) proximity to exterior 172 of volumetric container 143; and (ii) interior enclosure 142 of volumetric container 143. Sensor 170a generally represents sensors located external to volumetric container 143, while sensor 170b generally represents sensors located external to volumetric container 143. Sensors 170a, 170b can be any one or more of a host of sensors including one or more of: (i) infrared sensor; (ii) optical sensor; (iii) range finding sensor; (iv) acoustic sensor; (v) pressure sensor; (vi) light curtain sensor; (vii) motion sensor; and (viii) door sensor. Sensors 170a, 170b can be any one or more of a host of sensors that can provide functions including one or more of (i) infrared imaging; (ii) optical imaging; (iii) range finding; (iv) acoustic sensing; (v) pressure sensing; (vi) light curtain sensing; (vii) motion sensing; and (viii) door sensing. Personnel authentication device 178 of security system 160 receives authentication credentials to verify authorized personnel. One or more sensors 170a, 170b of security system 160 detects a presence of a person in at least one of: (i) proximity to exterior 172 of volumetric container 143; and (ii) interior enclosure 142 of volumetric container 143. Sensor 170a generally represents sensors located external to volumetric container 176, while sensor 170b generally represents sensors located internal to volumetric container 176. Sensors 170a, 170b can be any one or more of a host of sensors that can provide functions including one or more of (i) infrared imaging; (ii) optical imaging; (iii) range finding; (iv) acoustic sensing; (v) pressure sensing; (vi) light curtain sensing; (vii) motion sensing; and (viii) door sensing. Personnel authentication device 178 can support one or more authentication capabilities including: (i) biometric voice recognition; (ii) biometric facial recognition; (iii) biometric fingerprint recognition; (iv) biometric retina recognition; (v) manual, gesture or oral passcode verification; (vi) access card reading; and (vii) radio frequency identification (RFID) badge interrogation.

In one or more embodiments, OT controller 168 serves, at least in part, as controller for security system 160. OT controller 168 is an information handling system that can include some or all of the functional components of RIHS 100. In addition, OT controller 168 can include specialized capabilities including functions of security communication device 180, which provides dormant, undiscoverable communication channel to separate NOC 113c. In one or more embodiments, security communication device 180 is a wireless wide area network (WWAN) communication device, such as a cellular telephone that is configured to ignore incoming call/session requests to make less discoverable by third parties that intend to cut off MDC 100 from notifying help. OT controller 168 is communicatively coupled to sensors 170a, 170b and personnel authentication device 178 via device interface (I/F) 182.

OT controller 168 has management processor 184 that executes security platform application 186 and multiple-factor authentication application 188 contained in memory 190. Multi-factor authentication is an authentication method in which a computer user or automated entity is granted access only after successfully presenting two or more pieces of evidence to an authentication mechanism. The two or more pieces of evidence can be based on knowledge, possession, or inherence. Memory 190 also includes power, environmental, and fire protection applications 192. OT controller 168 is communicatively coupled, either directly or indirectly, via in-band and out-of-band communication networks 114a, 114b to secure IT components 102.

In one or more embodiments, security platform application 186 is configured to communicate with at least one of NOCs 113a-c following detection of an un-authorized/unauthenticated person. The at least one of NOCs 113a-c can notify support personnel to travel to MDC 100. Human or automated response systems at one of NOCs 113a-c can analyze sensor data as a required first step before MDC 100 is instructed to implement or cancel an action to secure IT components 102. In an alternate embodiment, human or automated response systems at the at least one of NOCs 113a-c can analyze sensor data as a follow-on step after MDC 100 has implemented an action to secure IT components 102.

OT controller 168 monitors connection 115a to in-band communication network 114a provided between IT component 106 and data center 112. In one or more embodiments, OT controller 168 determines operability exists based on whether there is electrical signal continuity between connection 115a and in-band communication network 114a. Lack of electrical signal continuity is indicative of physical tampering with hardware that provides connection 115a to in-band communication network 114a. In response to determining that connection 115a to in-band communication network 114a is not operable for communication between IT component 106 and data center 112, OT controller 168: (i) activates security communication device 180; (ii) establishes secondary communication network 194 via the security communication device with NOC 113c that is remote to MDC 100; (iii) notifies a management console at NOC 113c that connection 115a to in-band communication network 114a is not operable for communication between the IT components 106 and data center 112 to prompt remote management of MDC 100. In one embodiment, MDC 100 can communicate sensor information to NOC 113c to facilitate remote management. For example, sensor information can include video and audio feed. The remote management can include notifying security personnel, instructing MDC 100 to implement security measures or to cancel security measures that were autonomously initiated or scheduled. In one embodiment, to enhance security, security communication device 180 does not accept in-bound communication session requests.

Figure 2:
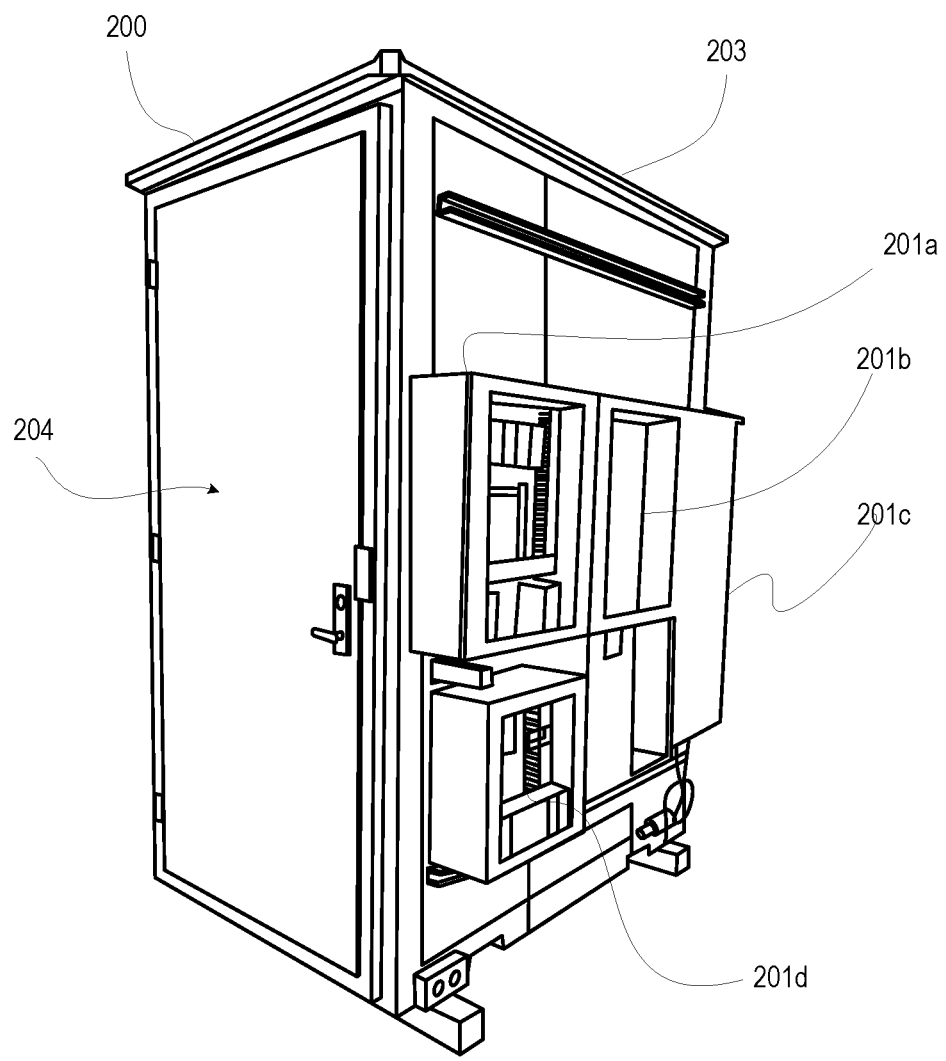
FIG. 2 is a side perspective view of an example MDC, according to one or more embodiments.
Figure 3:
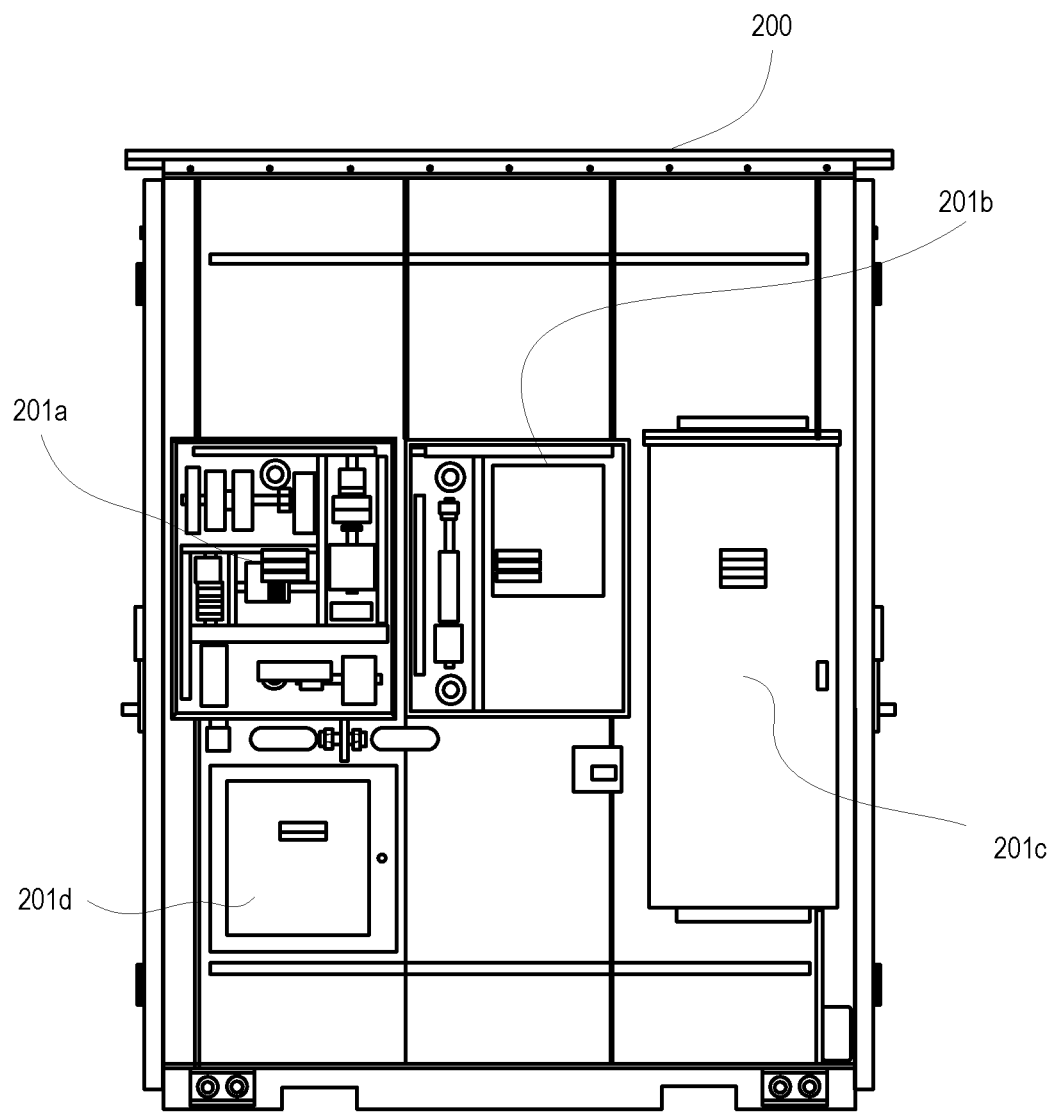
FIG. 3 is a front view of the example MDC, according to one or more embodiments.
Figure 4:
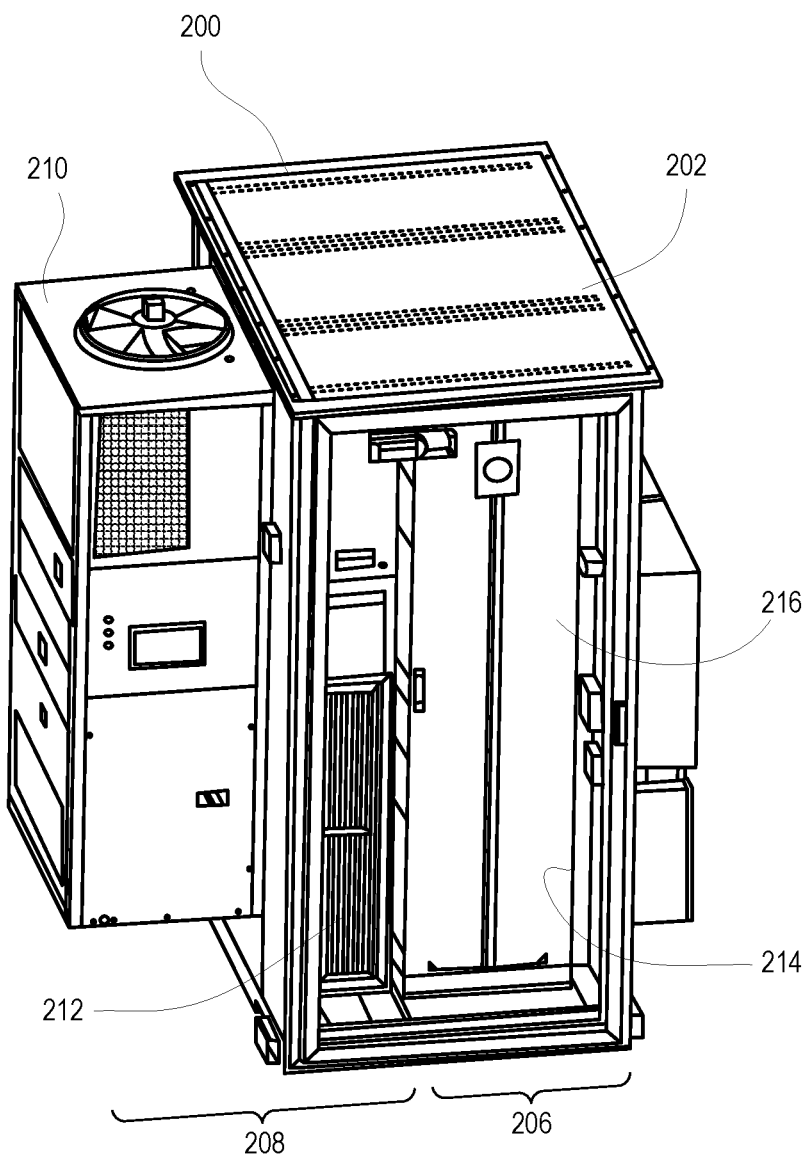
FIG. 4 is a top perspective view of the example MDC equipped with information technology (IT) and operation technology (OT) components, according to one or more embodiments.

FIG. 2 depicts a side perspective view of an example micro-MDC 200 that is palletized for delivery. Micro-MDC 200 can contain at least some of the same or similar functional components described for MDC 100 (FIG. 1). External enclosures 201a-d provide access, respectively, to controls, security, power, and network. Internal access of interior enclosure 202 (FIG. 4) of volumetric container 203 is through door 204. FIG. 3 depicts a front view of the example micro-MDC 200. FIG. 4 depicts a top perspective view of example micro-MDC 200 with door 204 (FIG. 2)

removed to expose IT components 206 and OT components 208. OT components 208 include air handling unit 210 that is externally mounted to enclosure 202. Air redirection structure 212 within interior enclosure 202 of volumetric container 203 directs cooling air through RIHS 216 of IT components 206. In one or more embodiments, MDC 200 is configured as micro MDC with one or two RIHS 216 for use as a modular edge data center (MEDC).

Figure 5:
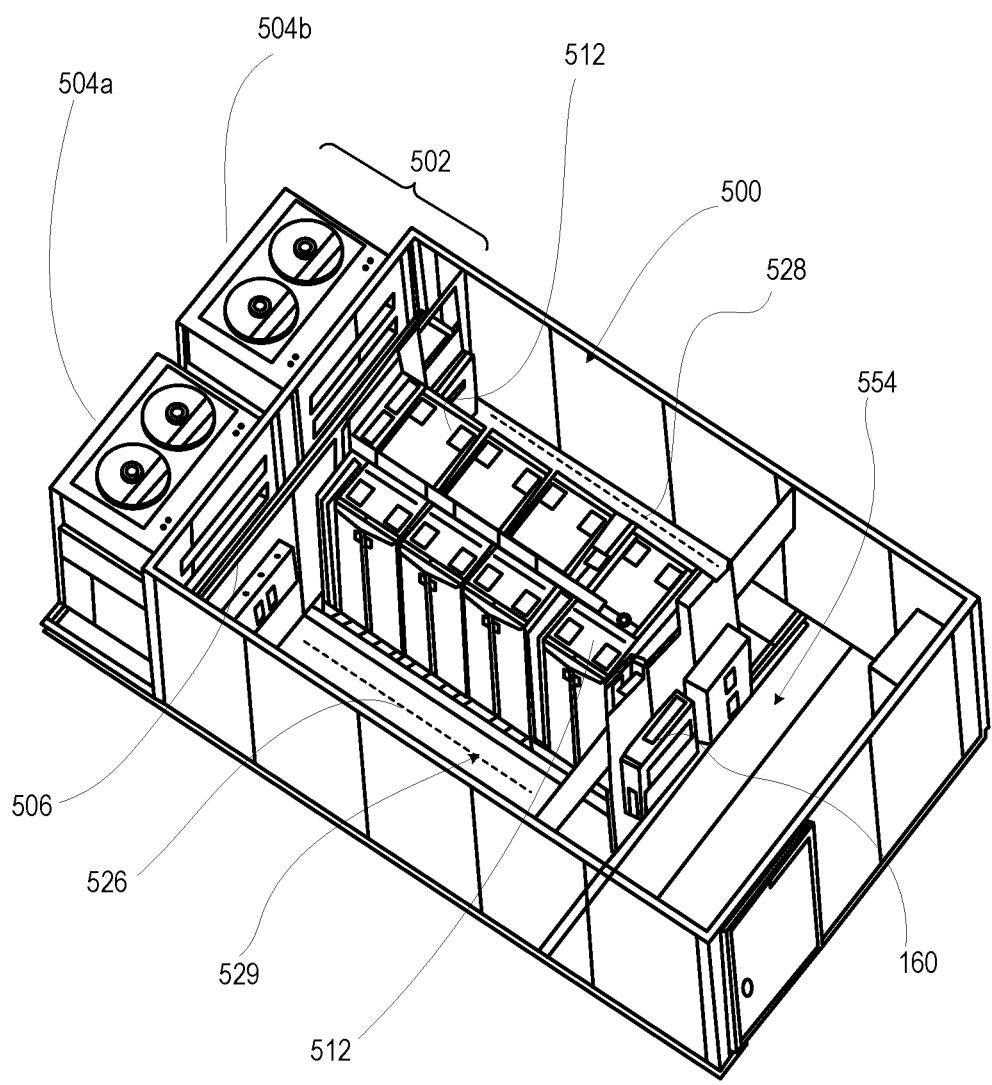
FIG. 5 is a top view of an example MDC having an IT compartment with a plurality of IT racks housing IT components that are protected from unauthorized access based on detection of a loss of connectivity with an external data center, according to one or more embodiments.

FIG. 5 depicts a three-dimensional, top view of example MEDC 500 that has IT compartment 529 and utility room 554. IT compartment 529 includes a longitudinal row of IT components 512 between cold and hot aisles 526, 528. Dual-AHU air handling system 502 of MEDC 500 includes two forward-mounted or aft-mounted AHUs 504a, 504b. AHUs 504a, 504b exchange cooling air via air redirection structure 506 with the IT compartment 529 and utility room 554 via cold and hot aisles 526, 528. Utility room 554 includes security system 160 MEDC 500 is an example larger MDC. However, aspects of the present disclosure can be applied to larger MDCs and MDCs that include multiple volumetric enclosures.

Figure 6:
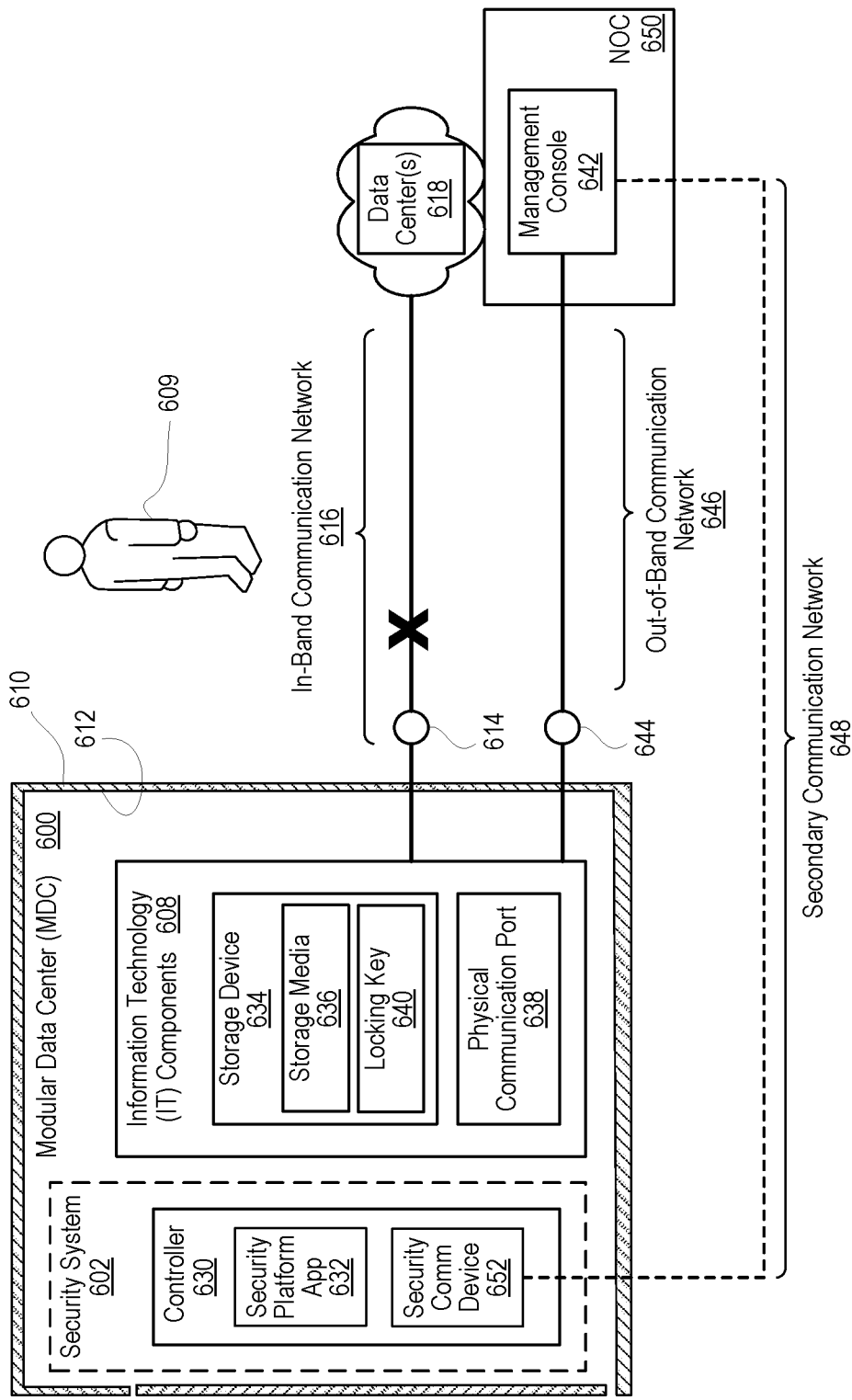
FIG. 6 is a simplified functional diagram of a security system of the MDC that secures the MDC from a potential unauthorized access in response to loss of communication with a data center, according to one or more embodiments.

FIG. 6 is a simplified functional diagram of MDC 600 having security system 602 that autonomously secures IT component(s) 608 of MDC 600 in response to an implied physical threat, such as a presence of person 609 that could be an unauthorized person. MDC 600 can be an implementation of MDC 100 (FIG. 1). MDC 600 has interior enclosure 610 of volumetric container 612 in which IT component(s) 608 is positioned. IT component(s) 608 has connection 614 to in-band communication network 616 that communicatively couples IT component(s) 608 and data center 618 external to MDC 600. Controller 630 is communicatively coupled to IT component(s) 608 and connection 614 to in-band communication network 616.

Controller 630 executes security platform application 632 that enables MDC 600 to detect and respond to an interruption in communications with data center 618, which interruption could be a prelude to an external threat to MDC 600 presented by detected person 609. In particular, controller 630 monitors connection 614 to in-band communication network 616 between IT component(s) 608 and data center 618, which is external to volumetric container 612 of MDC 600. IT component(s) 608 are positioned within interior enclosure 610 of volumetric container 612. IT component(s) 608 include at least one of: (i) storage device 634 containing storage media 636; and (iii) physical communication port 638. Controller 630 determines whether connection 614 to in-band communication network 616 is operable for communication between IT component(s) 608 and data center 618. In response to determining that connection 614 to in-band communication network 616 is not operable for communication between IT component(s) 608 and data center 618, controller 630 secures IT component(s) 608 by performing a selected one or more of: (i) removing locking key 640 of storage device 634 to encrypt storage media 636; and (ii) disabling physical communication port 638. Then, controller 630 periodically redetermines or checks whether connection 614 to in-band communication network 616 is operable for communication between IT component(s) 608 and data center 618. In response to determining that connection 614 to in-band communication network 616 is operable for communication between IT component(s) 608 and data center 618, controller 630 reverses the security measure that secures IT component(s) 608 by re-issuing locking key 640 of storage device 634 to decrypt storage media 636.

In one or more embodiments, IT component(s) 608 and controller 630 are communicatively coupled to management console 642 that is remote to MDC 600 via connection 644 to out-of-band communication network 646. Controller 630 determines whether a manual cancellation is received from management console 642 via connection 644 to out-of-band communication network 646. In response to determining that the manual cancellation is received from management console 642, controller 630 performs multiple factor authentication of the management console 642. Multiple factor authentication can include verifying two or more aspects of: (i) an encryption code received from management console 642; (ii) a communication address of management console 642; and (iii) a third-party verification of management console 642. Controller 630 re-issues, or prompts re-issue, of locking key 640 to the storage device based on the multiple factor authentication.

In one or more embodiments, controller 630 activates dormant secondary communication network 648 to serve as a wireless out-of-band communication network with network operations center (NOC) 650, which can include management console 642 or be separate from management console 642. Controller 630 activates security communication device 652. In one or more embodiments, security communication device 652 is a cellular communication device that does not accept in-bound communication session requests. Controller 630 establishes secondary communication network 648 via security communication device 652. Controller 630 notifies management console 642 at NOC 650 that connection 614 to in-band communication network 616 is not operable for communication between IT component(s) 608 and the data center to prompt remote management of the MDC.

Figure 7A:
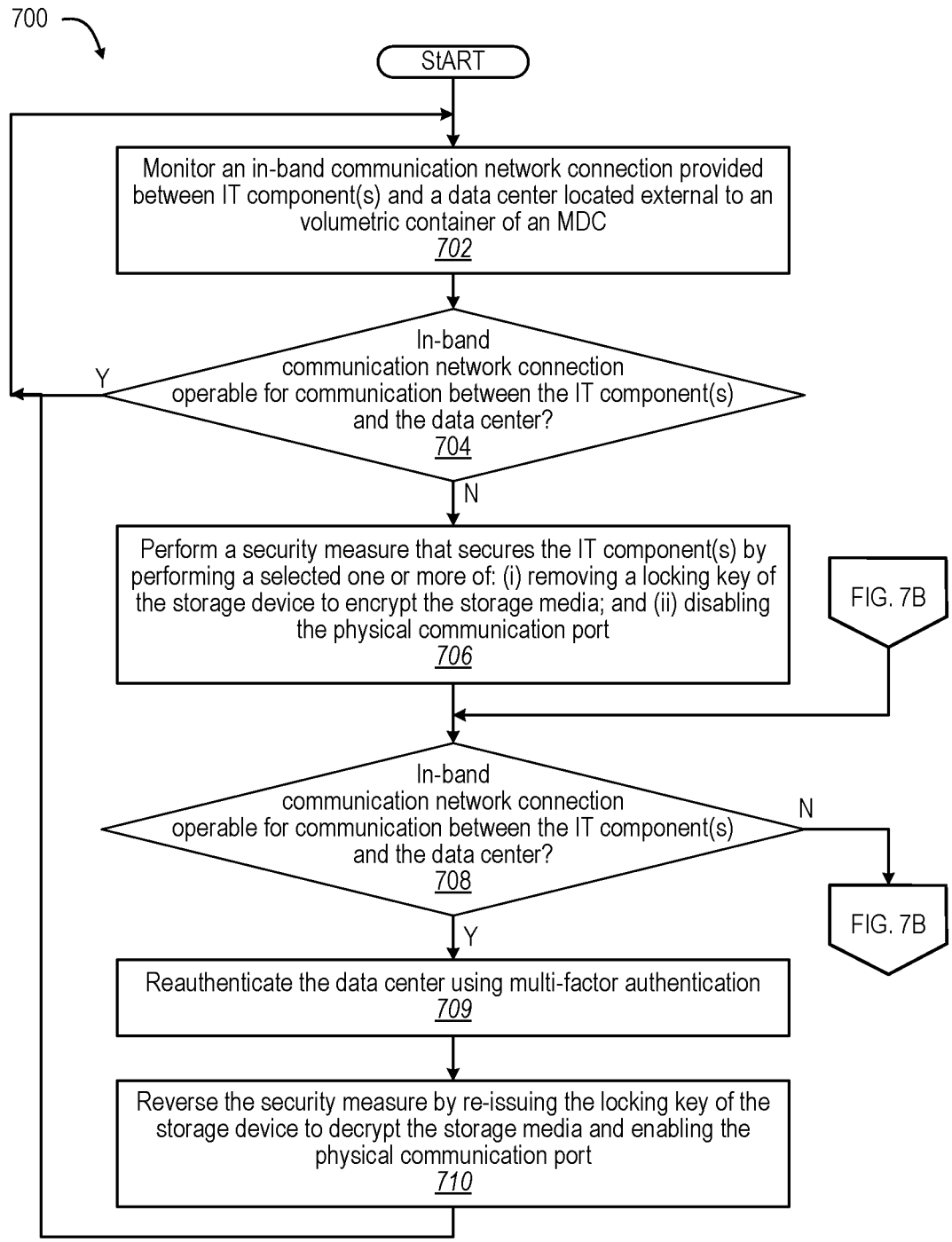
FIGS. 7A-7B present a flow diagram of a method for securing an MDC from a potential unauthorized access in response to detecting loss of communication with a data center, according to one or more embodiments.
Figure 7B:
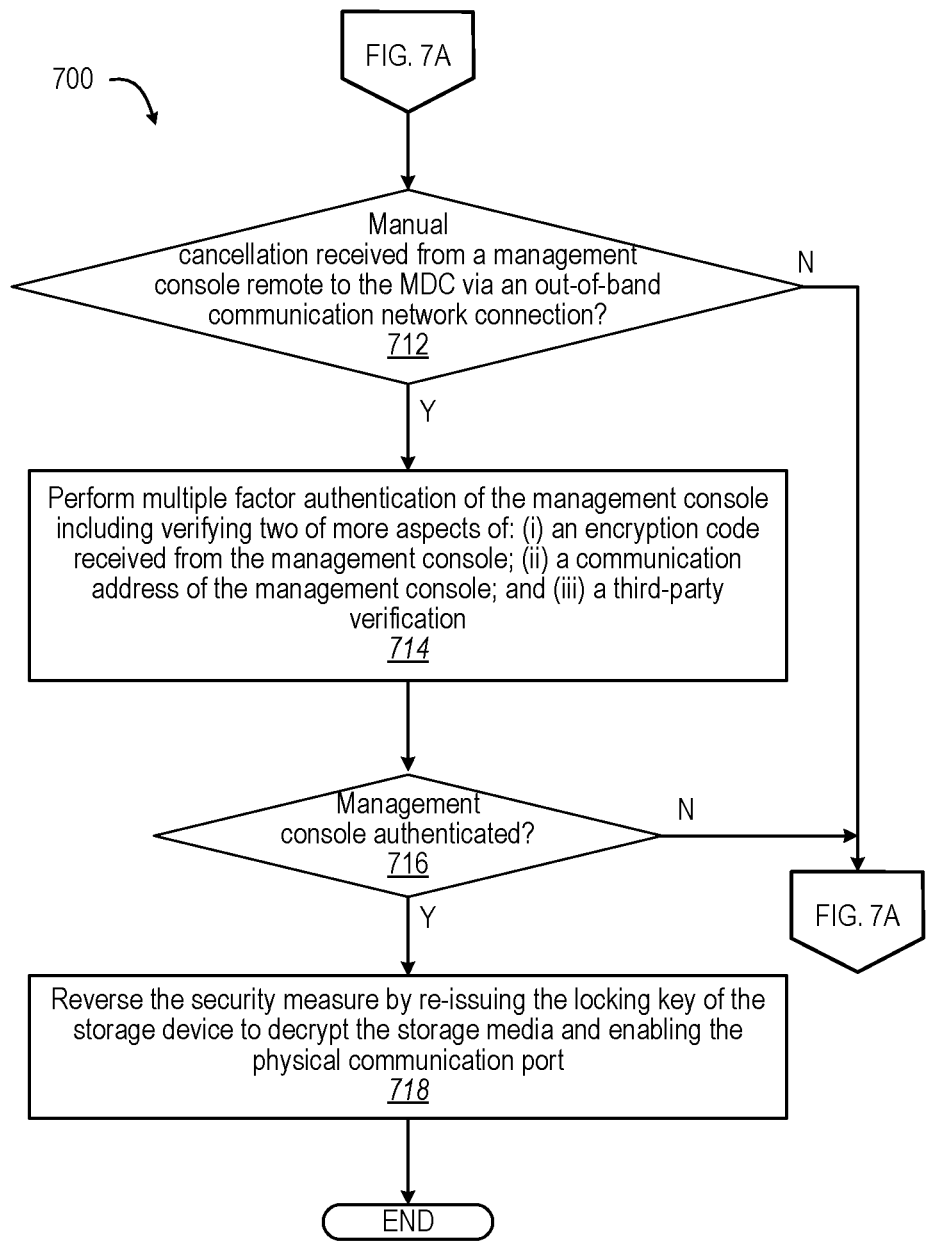

FIGS. 7A-B present flow diagrams of method 700 for securing an MDC from an unauthorized person in response to loss of communication with a data center. OT controller 168 (FIG. 1) or controller 630 (FIG. 6) respectively enable MDC 100 (FIG. 1) and MDC 600 (FIG. 6) to perform method 700. With initial reference to FIG. 7A, method 700 includes monitoring an in-band communication network connection provided between IT component(s) of an MDC and a data center located external to a volumetric container of the MDC (block 702). The IT component(s) is positioned within a selected at least one of: (i) an interior enclosure of the volumetric container; and (ii) an exterior panel attached to the volumetric container. The IT component(s) includes at least one of: (i) a storage device containing storage media; and (ii) a physical communication port that enables local access to the at least one IT component. Controller 168 determines in decision block 704, whether the in-band communication network connection is operable for communication between the IT component(s) and the data center.

In response to determining that the in-band communication network connection is operable for communication between the IT component(s) and the data center, method 700 returns to block 702. In response to determining that the in-band communication network connection is not operable for communication between the IT component(s) and the data center, controller performs a security measure that secures the IT component(s) by performing a selected one or more of: (i) removing a software locking key of the storage device to encrypt the storage media; and (ii) disabling the physical communication port (block 706). In one or more embodiments, OT controller 168 (FIG. 1) prompts processor subsystem 116 to either delete or re-issue the locking keys.

Method 700 includes periodically checking, in decision block 708 whether the in-band communication network connection becomes operable for communication between the IT component(s) and the data center. In response to determining that the in-band communication network connection is operable for communication between the IT component(s) and the data center, method 700 includes reauthenticating the data center using multi-factor authentication (block 709). Method 700 includes reversing the security measure by re-issuing the locking key of the storage device to decrypt the storage media and enabling the physical communication port (block 710). Then method 700 returns to block 702.

With reference to FIG. 7B, in response to determining that the in-band communication network connection is not operable for communication between the IT component(s) and the data center, controller determines, in decision block 712 whether a manual cancellation is received from a management console remote to the MDC via an out-of-band communication network connection. In response to not receiving the manual cancellation from a management console remote to the MDC via an out-of-band communication network connection, method 700 returns to block 708 (FIG. 7A). In response to determining that the manual cancellation is received from the management console, controller performs multiple factor authentication of the management console. Multiple factor authentication includes verifying two of more aspects of: (i) an encryption code received from the management console; (ii) a communication address of the management console; and (iii) a third-party verification (block 714). A determination is made, in decision block 716, whether the management console is authenticated. In response to not authenticating the management console, method 700 returns to block 708 (FIG. 7A). In response to authenticating the management console, method 700 includes reversing a security measure that secures the IT component(s) by re-issuing the locking key of the storage device to decrypt the storage media and by enabling the physical communication port (block 718). Then method 700 ends.

Figure 8:
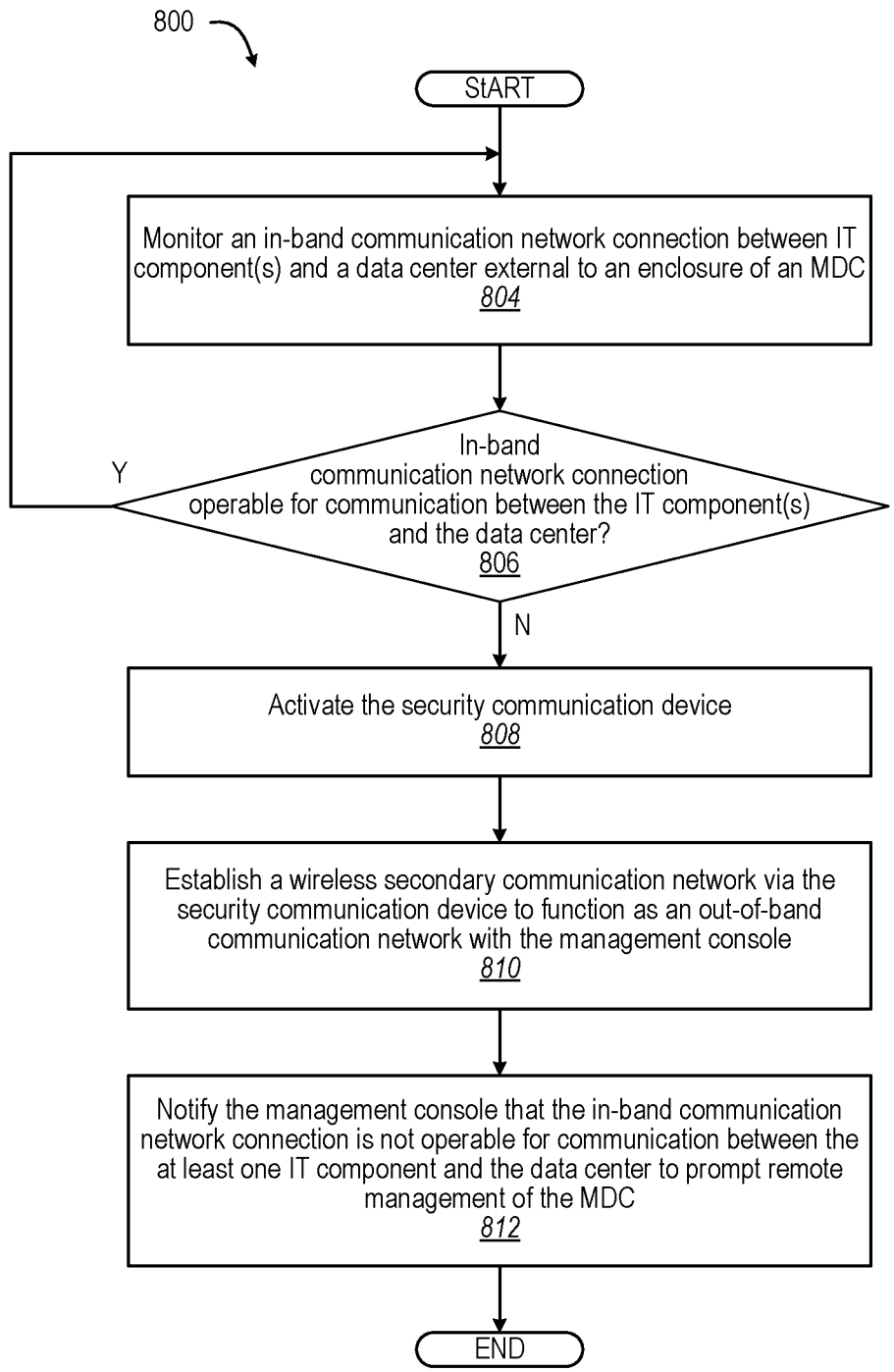
FIG. 8 presents a flow chart of a method for activating a dormant secondary communication network to serve as a wireless out-of-band communication network with a network operations center (NOC), according to one or more embodiments.

FIG. 8 presents a flow chart of method 800 for activating a dormant secondary communication network to serve as a wireless out-of-band communication network with a network operations center (NOC). OT controller 168 (FIG. 1) or controller 630 (FIG. 6) enable respectively MDC 100 (FIG. 1) and MDC 600 (FIG. 6) to perform method 800. Method 800 includes monitoring an in-band communication network connection provided between IT component(s) of an MDC and a data center located external to a volumetric container of the MDC (block 804). Controller determines in decision block 806, whether the in-band communication network connection is operable for communication between the IT component(s) and the data center. In one or more embodiments, network hardware that carry the in-band communication network connection are co-located with other network hardware or are the same network hardware that carries an out-of-band communication network connection. Physical destruction of the network hardware would disrupt both the in-band communication network connection and the out-of-band communication network connection. In response to determining that the in-band communication network connection is operable for communication between the at least one IT component and the data center, method 800 returns to block 802. In response to determining that the in-band communication network connection is not operable for communication between the at least one IT component and the data center, method 800 includes activating the security communication device (block 808). Method 800 includes establishing a wireless secondary communication network via the security communication device to function as an out-of-band communication network with the management console (block 810). Method 800 includes notifying the management console that the in-band communication network connection is not operable for communication between the at least one IT component and the data center. According to one embodiment, notification of the management console also prompts remote management of the MDC (block 812). With the security communication device functioning as an out-of-band communication network connection, the management console can interact with the MDC as described above, such as receiving sensor information, manually cancelling security measures, manually triggering additional security measures, alerting personnel to intervene on-site, etc. Then method 800 ends.

In the above described flow chart of FIGS. 7A-B and 8 one or more of the methods may be embodied in OT controller 168 (FIG. 1) or controller 530 (FIG. 5) that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

In one or more embodiments, a modular data center (MDC) includes a volumetric container having an interior enclosure. At least one information technology (IT) component of the MDC is positioned within the volumetric container. The at least one IT component includes a selected one or more of: (i) a storage device containing storage media; (ii) a physical communication port; and (iii) an in-band communication network connection between the at least one IT component and a data center external to the MDC. A security system of the MDC includes a security communication device and a controller communicatively coupled to the at least one IT component, the in-band communication network connection, and the security communication device. The controller executes a security platform application that enables the MDC to secure the IT components from an external threat. The controller determines whether the in-band communication network connection is operable for communication between the at least one IT component and the data center. In response to determining that the in-band communication network connection is not operable for communication between the at least one IT component and the data center, the controller activates the security communication device. The controller establishes a secondary communication network via the security communication device with a network operations center (NOC) remote to the MDC. The controller notifies a management console at the NOC that the in-band communication network connection is not operable for communication between the at least one IT component and the data center to prompt remote management of the MDC.

In one or more embodiments, the security communication device is a cellular communication device. In one or more embodiments, the security communication device does not accept in-bound communication session requests.

In one or more embodiments, the at least one IT component is the storage device containing storage media. In response to notifying the management console at the NOC that the in-band communication network connection is not operable, the controller enables the MDC to: (i) determine whether a remote command is received via the secondary communication network from the management console to secure the MDC; and (ii) remove a locking key of the storage device to encrypt the storage media in response to determining that the remote command is received.

In one or more embodiments, the at least one IT component is the physical communication port. In response to notifying the management console at the NOC that the in-band communication network connection is not operable, the controller enables the MDC to: (i) determine whether a remote command is received via the secondary communication network from the management console to secure the MDC; and (ii) disable the physical communication port in response to determining that the remote command is received.

In one or more embodiments, the controller enables the MDC to: (i) in response to determining that the in-band communication network connection is operable, receive remote commands from a first management console of a first NOC via the in-band communication network connection; and (ii) in response to determining that the in-band communication network connection is not operable, receive remote commands from a second management console of the NOC that comprises a second NOC that is separate from the first NOC.

In one or more embodiments, a method is provided for autonomously securing an MDC from an un-authorized, un-authenticated person. The method includes determining whether an in-band communication network connection between at least one IT component and a data center external to an MDC is operable. The at least one component is positioned within an interior enclosure of a volumetric container of the MDC. The at least one IT component includes a selected one or more of: (i) a storage device containing storage media; and (ii) a physical communication port. In response to determining that the in-band communication network connection is not operable for communication between the at least one IT component and the data center the controller, the method includes: (i) activating a security communication device; (ii) establishing a secondary communication network via the security communication device with a NOC remote to the MDC; and (iii) notifying a management console at the NOC that the in-band communication network connection is not operable for communication between the at least one IT component and the data center to prompt remote management of the MDC.

In one or more embodiments, activating the security communication device comprises activating a cellular communication device. In one or more embodiments, the method includes not accepting in-bound communication session requests by the security communication device.

In one or more embodiments, the method includes: determining whether a remote command is received via the secondary communication network from the management console to secure the MDC; and removing a locking key of a storage device of the at least one IT component to encrypt storage media contained by the storage device in response to determining that the remote command is received.

In one or more embodiments, the method includes: determining whether a remote command is received via the secondary communication network from the management console to secure the MDC; and disabling a physical communication port of the at least one IT component in response to determining that the remote command is received.

In one or more embodiments, the method includes: in response to determining that the in-band communication network connection is operable, receiving remote commands from a first management console of a first NOC via the in-band communication network connection; and, in response to determining that the in-band communication network connection is not operable, receiving remote commands from a second management console of the NOC that comprises a second NOC that is separate from the first NOC.

One or more of the embodiments of the disclosure described can be implemented, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A modular data center (MDC) comprising:
a volumetric container having an interior enclosure;
at least one information technology (IT) component positioned within a selected at least one of: (i) the interior enclosure of the volumetric container; and (ii) an exterior panel attached to the volumetric container, the at least one IT component comprising at least one of: (i) a storage device containing storage media; and (iii) a physical communication port that enables local access to the at least one IT component; and an in-band communication network connection provided between the at least one IT component and a data center that is external to the MDC; a security system comprising: a controller communicatively coupled to the at least one IT component and the in-band communication network connection, the controller executing a security platform application that enables the MDC to: monitor the in-band communication network connection for a loss in communication that can be indicative of a preparatory act by an unauthorized/un-authenticated person to compromise the at least one IT component or access computing workload and/or data; determine whether the in-band communication network connection is operable for communication between the at least one IT component and the data center; and in response to determining that the in-band communication network connection is not operable for communication between the at least one IT component and the data center, perform a security measure that secures the at least one IT component, the computing workload, and/or the data by performing a selected one or more of: (i) removing a locking key of the storage device to encrypt the storage media; and (ii) disabling the physical communication port to prevent access to the at least one IT component via a device inserted in the physical communication port by the unauthorized person.

2. The MDC of claim 1, wherein, in response to securing the at least one IT component, the controller enables the MDC to:
periodically redetermine whether the in-band communication network connection is operable for communication between the at least one IT component and the data center; and
in response to determining that the in-band communication network connection is operable for communication between the at least one IT component and the data center, reverse the security measure by re-issuing the locking key of the storage device to decrypt the storage media.

3. The MDC of claim 1, further comprising an out-of-band communication network connection that is communicatively coupled between the at least one IT component, the controller, and a management console remote to the MDC, wherein the controller enables the MDC to:
determine whether a manual cancellation is received from the management console via the out-of-band communication network connection;
in response to determining that the manual cancellation is received from the management console, perform multiple factor authentication of the management console comprising verifying two of more aspects of: (i) an encryption code received from the management console; (ii) a communication address of the management console; and (iii) a third-party verification of the management console; and
reissue the locking key to the storage device based on the multiple factor authentication.

4. The MDC of claim 1, wherein, in response to disabling the physical communication port, the controller enables the MDC to:
periodically redetermine whether the in-band communication network connection has become operable for communication between the at least one IT component and the data center; and
in response to determining that the in-band communication network connection has become operable for communication between the at least one IT component and the data center, reverse the security measure by enabling the physical communication port.

5. The MDC of claim 1, further comprising an out-of-band communication network connection that is communicatively coupled between the at least one IT component, the controller, and a management console remote to the MDC, wherein the controller enables the MDC to:
determine whether a manual cancellation is received from the management console via the out-of-band communication network connection;
in response to determining that the manual cancellation is received from the management console, perform multiple factor authentication of the management console comprising verifying two of more aspects of: (i) an encryption code received from the management console; (ii) a communication address of the management console; and (iii) a third-party verification; and
in response to performing the multiple factor authentication, reverse the security measure by enabling the physical communication port.

6. The MDC of claim 1, wherein, in response to determining that the in-band communication network connection is not operable for communication between the at least one IT component and the data center, the controller enables the MDC to:
activate a security communication device;
establish a wireless secondary communication network via the security communication device to function as an out-of-band communication network with the management console; and
notify the management console that the in-band communication network connection is not operable for communication between the at least one IT component and the data center to prompt remote management of the MDC.

7. The MDC of claim 6, wherein the security communication device comprises a cellular communication device.

8. The MDC of claim 6, wherein the security communication device does not accept in-bound communication session requests.

9. A modular data center (MDC) security system comprising: a controller communicatively coupled to at least one IT component positioned within a selected at least one of: (i) an interior enclosure of a volumetric container of a MDC; and (ii) an exterior panel attached to the volumetric container, the at least one IT component comprising at least one of: (i) a storage device containing storage media; and (iii) a physical communication port that enables local access to the at least one IT component, the controller communicatively coupled to an in-band communication network connection provided between the at least one IT component and a data center that is external to the MDC, the controller executing a security platform application that enables the MDC to: monitor the in-band communication network connection for a loss in communication that can be indicative of a preparatory act by an unauthorized person to compromise the at least one IT component or access computing workload and/or data; determine whether the in-band communication network connection is operable for communication between the at least one IT component and the data center; and in response to determining that the in-band communication network connection is not operable for communication between the at least one IT component and the data center, perform a security measure that secures the at least one IT component, computing workload, and data by performing a selected one or more of: (i) removing a locking key of the storage device to encrypt the storage media; and (ii) disabling the physical communication port to prevent access to the at least one IT component via a device inserted in the physical communication port by the unauthorized person.

10. The MDC security system of claim 9, wherein, in response to securing the at least one IT component, the controller enables the MDC to:
periodically redetermine whether the in-band communication network connection is operable for communication between the at least one IT component and the data center; and
in response to determining that the in-band communication network connection is operable for communication between the at least one IT component and the data center, reverse the security measure by re-issuing the locking key of the storage device to decrypt the storage media.

11. The MDC security system of claim 9, further comprising an out-of-band communication network connection that is communicatively coupled between the at least one IT component, the controller, and a management console remote to the MDC, wherein the controller enables the MDC to:
determine whether a manual cancellation is received from the management console via the out-of-band communication network connection;
in response to determining that the manual cancellation is received from the management console, perform multiple factor authentication of the management console comprising verifying two of more aspects of: (i) an encryption code received from the management console; (ii) a communication address of the management console; and (iii) a third-party verification of the management console; and
reissue the locking key to the storage device based on the multiple factor authentication.

12. The MDC security system of claim 9, wherein, in response to disabling the physical communication port, the controller enables the MDC to:
periodically redetermine whether the in-band communication network connection has become operable for communication between the at least one IT component and the data center; and
in response to determining that the in-band communication network connection has become operable for communication between the at least one IT component and the data center, reverse the security measure by enabling the physical communication port.

13. The MDC security system of claim 9, further comprising an out-of-band communication network connection that is communicatively coupled between the at least one IT component, the controller, and a management console remote to the MDC, wherein the controller enables the MDC to:
determine whether a manual cancellation is received from the management console via the out-of-band communication network connection;
in response to determining that the manual cancellation is received from the management console, perform multiple factor authentication of the management console comprising verifying two of more aspects of: (i) an encryption code received from the management console; (ii) a communication address of the management console; and (iii) a third-party verification; and
in response to performing the multiple factor authentication, reverse the security measure by enabling the physical communication port.

14. A method of autonomously securing a modular data center (MDC) from un-authorized/un-authenticated access in response to detecting a loss of communication with a data center that can be indicative of a preparatory act by an unauthorized person to compromise the MDC, the method comprising:
monitoring an in-band communication network connection provided between at least one information technology (IT) component and a data center that is external to a volumetric container of a MDC, the at least one IT component positioned within a selected at least one of: (i) an interior enclosure of the volumetric container; and (ii) an exterior panel attached to the volumetric container, the at least one IT component comprising at least one of: (i) a storage device containing storage media; and (iii) a physical communication port;
determining whether the in-band communication network connection is operable for communication between the at least one IT component and the data center; and
in response to determining that the in-band communication network connection is not operable for communication between the at least one IT component and the data center:
performing a security measure that secures the at least one IT component, the computing workload, and/or the data by performing a selected one or more of: (i) removing a locking key of the storage device to encrypt the storage media; and (ii) disabling the physical communication port to prevent access to the at least one IT component via a device inserted in the physical communication port by the unauthorized person.

15. The method of claim 14, further comprising, in response to securing the at least one IT component:
periodically redetermining whether the in-band communication network connection is operable for communication between the at least one IT component and the data center; and
in response to determining that the in-band communication network connection is operable for communication between the at least one IT component and the data center, reverse the security measure by re-issuing the locking key of the storage device to decrypt the storage media.

16. The method of claim 14, further comprising:
determining whether a manual cancellation is received from a management console remote to the MDC via an out-of-band communication network connection;
in response to determining that the manual cancellation is received from the management console, performing multiple factor authentication of the management console comprising verifying two of more aspects of: (i) an encryption code received from the management console; (ii) a communication address of the management console; and (iii) a third-party verification of the management console; and reissuing the locking key to the storage device based on the multiple factor authentication.

17. The method of claim 14, further comprising, in response to disabling the physical communication port:

periodically redetermining whether the in-band communication network connection has become operable for communication between the at least one IT component and the data center; and in response to determining that the in-band communication network connection has become operable for communication between the at least one IT component and the data center, reverse the security measure by enabling the physical communication port.

18. The method of claim 14, further comprising:

determining whether a manual cancellation is received from a management console remote to the MDC via an out-of-band communication network connection;

in response to determining that the manual cancellation is received from the management console, performing multiple factor authentication of the management console comprising verifying two of more aspects of: (i) an encryption code received from the management console; (ii) a communication address of the management console; and (iii) a third-party verification; and in response to performing the multiple factor authentication, reversing the security measure by enabling the physical communication port.

19. The method of claim 14, further comprising:

in response to determining that the in-band communication network connection is not operable for communication between the at least one IT component and the data center:

activating a security communication device;

establishing a wireless secondary communication network via the security communication device to function as an out-of-band communication network with the management console; and notifying the management console that the in-band communication network connection is not operable for communication between the at least one IT component and the data center to prompt remote management of the MDC.

* * * * *